(12) United States Patent
Balen (10) Patent No.: US 11,045,881 B2
(45) Date of Patent: Jun. 29, 2021

(54) QUICK CHANGE TOOL

(71) Applicant: MIREKAJA A.G., Chur (CH)

(72) Inventor: Frank Pieter Jacobus Balen, Harderwijk (NL)

(73) Assignee: MIREKAJA A.G., Chur (CH)

( * ) Notice: Subject to any disclaimer, the term of this patent is extended or adjusted under 35 U.S.C. 154(b) by 33 days.

(21) Appl. No.: 16/472,098

(22) PCT Filed: Dec. 21, 2017

(86) PCT No.: PCT/IB2017/058267
§ 371 (c)(1),
(2) Date: Jun. 20, 2019

(87) PCT Pub. No.: WO2018/116231
PCT Pub. Date: Jun. 28, 2018

(65) Prior Publication Data
US 2020/0086395 A1 Mar. 19, 2020

(30) Foreign Application Priority Data
Dec. 23, 2016 (NL) ...................................... 2018062

(51) Int. Cl.
*B23B 31/107* (2006.01)
*B23B 51/04* (2006.01)

(52) U.S. Cl.
CPC ...... *B23B 31/1074* (2013.01); *B23B 51/0426* (2013.01); *B23B 51/0473* (2013.01)

(58) Field of Classification Search
CPC ............ B23B 51/0426; B23B 2251/02; B23B 2231/0244; B23B 2231/0276;
(Continued)

(56) References Cited

U.S. PATENT DOCUMENTS 10,279,459 B2 * 5/2019 Tsubakimoto ...... B25B 23/0035
2013/0127123 A1 * 5/2013 Miyanaga ........... B23B 51/0473
279/76

FOREIGN PATENT DOCUMENTS

EP 1447195 A1 8/2004
JP H0441114 A 2/1992
(Continued)

OTHER PUBLICATIONS

Machine Translation, EP1447195A1, Biedron et al., Aug. 18, 2004. (Year: 2004).*
(Continued)

*Primary Examiner* — Chwen-Wei Su
(74) *Attorney, Agent, or Firm* — Kacvinsky Daisak Bluni PLLC (57) ABSTRACT

A quick change tool includes a tool element, an elongate body having a drive shaft and attaching means for attaching the tool element to the body, and a receiving element for attaching to the tool element. The receiving element includes a through-hole for receiving the body by sliding through the receiving element in the longitudinal direction of the body. The receiving element is configured to co-act with the attaching means to lock the tool element relative to the body at least in an axial direction of the drive shaft. The attaching means includes a resiliently movable locking pin arranged spring-mounted in the body. The receiving element comprises a locking hole configured to receive the locking pin therein in a snapping manner. A pin guiding groove extends between a receiving opening of the through-hole and the locking hole for guiding the locking pin from the receiving opening to the locking hole.

18 Claims, 7 Drawing Sheets

(58) Field of Classification Search
CPC ........ B23B 2231/0264; B23B 2231/46; B23B 2231/48; B23B 31/1074; B23B 51/0473; B23B 51/0453; Y10T 279/17786; Y10T 279/17145; Y10S 279/905
See application file for complete search history.

(56) References Cited

FOREIGN PATENT DOCUMENTS

JP          04075812 A  *  3/1992  ............. B28D 1/041
WO      2016072856 A1      5/2016

OTHER PUBLICATIONS

International Search Report from PCT/IB2017/058267 dated Apr. 18, 2018, 6 pages.
Written Opinion from PCT/IB2017/058267 dated Apr. 18, 2018, 7 pages.

* cited by examiner

QUICK CHANGE TOOL

This is a national stage application filed under 35 U.S.C. § 371 of pending international application PCT/IB2017/058267 filed Dec. 21, 2017, which claims priority to Netherlands Patent application NL 2018062, filed Dec. 23, 2016, the entirety of which applications are hereby incorporated by reference herein.

The present invention relates to a tool. The present invention relates particularly to a quick change tool comprising a tool element, an elongate body comprising close to a first outer end thereof a drive shaft for driving the body by means of a drive device to be arranged thereon and, close to a second outer end thereof lying opposite the first outer end, attaching means for attaching the tool element to the body, and a receiving element for attaching to the tool element, having a through-hole for receiving the body by sliding through the receiving element in the longitudinal direction of the body, wherein the receiving element is configured to co-act with the attaching means in order to lock the tool element relative to the body at least in axial direction of the drive shaft.

A quick change tool is a tool with which a tool element can be exchanged for another tool element in a relatively simple and therefore rapid manner. As a result, a machining and/or production process can proceed efficiently and effectively, which can shorten throughput times and can reduce costs associated therewith. A known quick change tool is formed by a hole saw which can be arranged on a drive shaft of a drill. In use of this quick change tool, hole saws of different diameters are exchanged quickly in order to arrange for instance recesses of different sizes in walls or floors of buildings so as to arrange for instance wall or floor sockets and/or lighting provisions such as spotlights therein.

A drawback of current quick change tools is that the mechanism for locking the tool element onto the shaft is susceptible to clearance and/or wear.

It is therefore an object of the invention to provide a more reliable and wear-resistant quick change tool.

The present invention provides for this purpose a quick change tool of the type stated in the preamble, with the special feature that the attaching means comprise a locking pin which is arranged spring-mounted in the body and which is resiliently movable between a rest position, wherein the locking pin protrudes radially outward from the body to a protruding height through a pin hole in the body, and a retracted position wherein the locking pin is situated at least substantially wholly in the body, and that the receiving element comprises a locking hole which is configured to receive the locking pin therein in a manner in which it snaps from its retracted position to its rest position, and a pin guiding groove extending between a receiving opening of the through-hole and the locking hole for guiding the locking pin from the receiving opening to the locking hole and simultaneously moving it from its rest position to its retracted position. A particular advantage of the above stated locking mechanism, consisting of a locking pin and a locking hole co-acting therewith, is formed by the simple construction thereof. Both the locking pin and the locking hole are manufactured by means of tried and tested machining processes which guarantee precision and therefore guarantee a clearance-free and reliable operation of the locking mechanism. Since the locking pin protrudes radially outward from the body through the locking hole in the situation in which the tool element is locked onto the body, said locking pin is perpendicular to the axial and rotational forces exerted on the tool element. The locking mechanism hereby guarantees extremely direct locking and therefore a very reliable operation of the tool element. A particular advantage of the above stated pin guiding groove between a receiving opening of the through-hole and the locking hole is that the tool element can be locked onto the body by means of a simple sliding movement, without the receiving element having to be precisely steered in order to arrange the locking pin in the locking hole. As a result, the tool element of the quick change tool can be arranged and locked quickly, which speeds up the machining and/or production process, whereby throughput times are shortened and work costs are reduced.

According to a preferred embodiment, the pin guiding groove extends from a receiving opening of the through-hole remote from the tool element to the locking hole and/or from a receiving opening of the through-hole directed toward the tool element to the locking hole. A particular advantage of a pin guiding groove extending from a receiving opening of the through-hole remote from the tool element to the locking hole is that during arranging of the tool element on the body by means of the receiving element, the locking pin need not be steered toward the locking hole in order to lock the tool element onto the body by means of the receiving element. Locking of the tool element onto the body takes place only by sliding the receiving element over the body and by snapping the locking pin into the locking hole. Other tool elements can hereby be arranged locked onto the body quickly and efficiently, resulting in an increase in efficiency of the machining and/or production processes. A particular advantage of a pin guiding groove extending from a receiving opening of the through-hole directed toward the tool element to the locking hole is that the tool element can be slid from the side of the drive shaft—from the side of a drill in the case of hole saws—toward the locking pin in order to be locked. This makes it possible to uncouple the tool element and slide it over the body from the second outer end toward the drive shaft, and then move it back toward the second outer end so as to once again lock the tool element by means of the receiving element. In the case of hole saws, this makes it possible to remove material which has accumulated in a recess of the hole saw between two successive sawing operations, such as a ball of wood, plaster or concrete, from the hole saw by uncoupling the hole saw and moving it away from the sawn material, and then once again snap-locking the hole saw onto the body by means of the receiving element for a subsequent sawing operation. The pin guiding groove is particularly advantageous here, since the hole saw covers the second outer end of the body all the way around, if the receiving element is situated close to the locking pin, and the locking pin can therefore not be easily steered from the outside to the locking hole.

According to a preferred embodiment, the pin guiding groove is arranged in an inner surface of a wall of the receiving element forming the periphery of the through-hole such that the pin guiding groove can receive the locking pin in its rest position at the receiving opening. A particular advantage hereof is that during arranging of the tool element on the body by means of the receiving element, the locking pin need not be pressed in toward the longitudinal axis of the body in order to slide the receiving element onto the body. This therefore facilitates and speeds up the arranging and locking of the tool element on(to) the body. This is particularly advantageous when the tool element is slid over the body from the first outer end toward second outer end of the body so as to snap-fix the tool element again between two operations, since the tool element covers the locking pin all the way around if the receiving element is situated close to the locking pin. The locking pin can therefore not be easily reached from the outside to be pressed in in order to carry it into the pin guiding groove. A pin guiding groove of such a form therefore facilitates the locking pin being snapped into the locking hole again to be locked after an uncoupling of the tool element and movement thereof toward the drive shaft.

According to a preferred embodiment, a depth of the locking hole is determined by a thickness of the wall at the position of the pin guiding groove close to the locking hole, wherein the thickness is such that the locking pin in its rest position in the locking hole can withstand at least forces exerted on the tool element in the axial direction of the drive shaft in order to lock the tool element relative to the body at least in the axial direction of the drive shaft, and that the locking pin can be pressed through the locking hole into the pin guiding groove from the outside by hand in order to unlock the tool element relative to the body at least in axial direction of the drive shaft. A particular advantage of a wall of such dimensions is on the one hand that at the position of the locking hole sufficient wall material is situated around the portion of the locking pin protruding from the body to withstand at least the axial forces being exerted via the tool element on the receiving element, and on the other hand that the wall is thin enough to enable the locking pin to be pressed in sufficiently toward the longitudinal axis of the body to release the receiving element relative to the body and thereby unlock the tool element in order to slide it away from the body or over the body toward the first outer end.

In a situation in which the tool element is arranged on the body, an inner side of the wall at the position of the pin guiding groove close to the locking hole preferably lies at least substantially against an outer side of the body at the position of the locking pin. A particular advantage hereof is that the wall can be relatively thin at the position of the locking hole so as to hold the locking pin in the locking hole without exerting axial and/or rotational forces thereon. A particular advantage of such a thin wall is then that the locking pin can be pressed relatively easily through the locking hole and into the pin guiding groove.

According to a preferred embodiment, the wall at the position of the pin guiding groove is locally thickened close to the receiving opening. A particular advantage of such a thickened portion is that the pin guiding groove can be accommodated therein close to the receiving opening, such that when the receiving element for attaching to the tool element is slid over the body, the locking pin can be received by the pin guiding groove without being pressed in. An additional advantage is that this thickened portion, particularly in the form of an upright edge or ridge, can be utilized as a handle for sliding the receiving element toward the first outer end of the body with sufficient grip.

According to a preferred embodiment, the pin guiding groove has a conical form, wherein the pin guiding groove narrows in the direction of the locking hole. A particular advantage of a pin guiding groove of such a form is that the locking pin need not be precisely aligned relative to the locking hole during receiving of the locking pin in the pin guiding groove. The pin guiding groove allows a small angular deviation between the longitudinal axis of the locking pin and an axis extending through the centre of the locking hole radially relative to the receiving element and/or a translational deviation between the locking pin and the locking hole, which facilitates reception of the locking pin in the pin guiding groove, such that this pin can be arranged in the pin guiding groove without much steering when the receiving element is slid over the body.

According to a preferred embodiment, a guiding angle between a longitudinal axis of the pin guiding groove and a longitudinal axis of the body lies between 1 and 60 degrees, particularly between 5 and 45 degrees, more particularly below 20 degrees. With such a guiding angle the locking pin can be pressed in without interference by the pin guiding groove when the receiving element is moved from the second outer end of the body to the first outer end and/or from the first outer end of the body toward the second outer end.

According to a preferred embodiment, a length of the receiving element lies between 10 and 50 mm, particularly between 12 and 45 mm. A receiving element of such dimensions is sufficiently large to accommodate the at least one pin guiding groove therein, but compact enough to realize the locking hole, and thereby the position of the locking, sufficiently close to the tool element.

According to a preferred embodiment, the locking pin is arranged spring-mounted in the body by means of a compression spring, wherein a diameter of a portion of the locking pin situated in the body is greater than the diameter of the pin hole. An upper side of the portion of the locking pin situated in the body therefore lies against an inner side of a wall of the body close to the pin hole, whereby the locking pin which is under spring pressure cannot come loose from the body through the pin hole. A particular advantage of a locking pin under spring pressure embodied in such a manner is that the locking pin is pushed radially outward with a determined force, which ensures a good locking of the tool element onto the body by the locking pin in the locking hole.

According to a preferred embodiment, the shape of a cross-section of the body close to the attaching means is not infinitely rotation-symmetrical, and corresponds at least substantially to the shape of the through-hole. A particular advantage of a body of such a shape is that it is hereby rotationally locked relative to the receiving element for attaching to the tool element, whereby the tool element is rotationally locked relative to the body.

According to a preferred embodiment, the body is at least substantially cylindrical, and flattened close to the attaching means, such that a cross-section of the body comprises at least a straight side close to the attaching means. The body is preferably formed by a cylindrical part which is flattened on two sides over at least substantially the whole length thereof, and the through-hole of the receiving element preferably has the counter-shape thereof, so that the receiving element can move freely over the body in axial direction but cannot rotate around the body round the longitudinal axis of the body. This guarantees a good rotational locking of the tool element relative to the body.

According to an embodiment, a key is arranged in the body at least close to the attaching means. The body is preferably formed by a cylindrical part in which one or more keys, as in a spline shaft, are arranged in the longitudinal direction of the body and the through-hole of the receiving element preferably has the counter-shape of the cylindrical part with the one or more keys therein, so that the receiving element can move freely over the body in the axial direction of the body but cannot rotate around the body round the longitudinal axis of the body. This provides for an extremely good rotational locking of the tool element relative to the body.

According to a preferred embodiment, the key forms a support surface for the compression spring. This enables a manufacturing method wherein the locking pin is arranged spring-mounted in the body in a simple manner.

According to a preferred embodiment, the diameter of the body is greater than the diameter of the drive shaft. A particular advantage of such a proportion between the diameter of the body and the diameter of the drive shaft is that the quick change tool is very stable and is therefore not susceptible, or only susceptible to very limited extent, to clearance between the different components. A large diameter of the body also provides space for a mechanism for fixing a centering drill in, which is particularly advantageous when the tool element is a hole saw. The diameter of the body preferably lies between 5 and 30 mm, particularly between 7 and 23 mm.

According to a preferred embodiment, the body is configured for attaching a centering drill releasably thereto close to the second outer end thereof. Such a centering drill aids in centering of the tool element on the surface to be machined and in holding the tool element at the correct position during the machining. The tool element preferably comprises a hole saw.

The present invention is further elucidated on the basis of the following figures which show preferred embodiments of the quick change tool according to the invention and are not intended to limit the scope of protection of the invention in any way, wherein.

Figure 1:
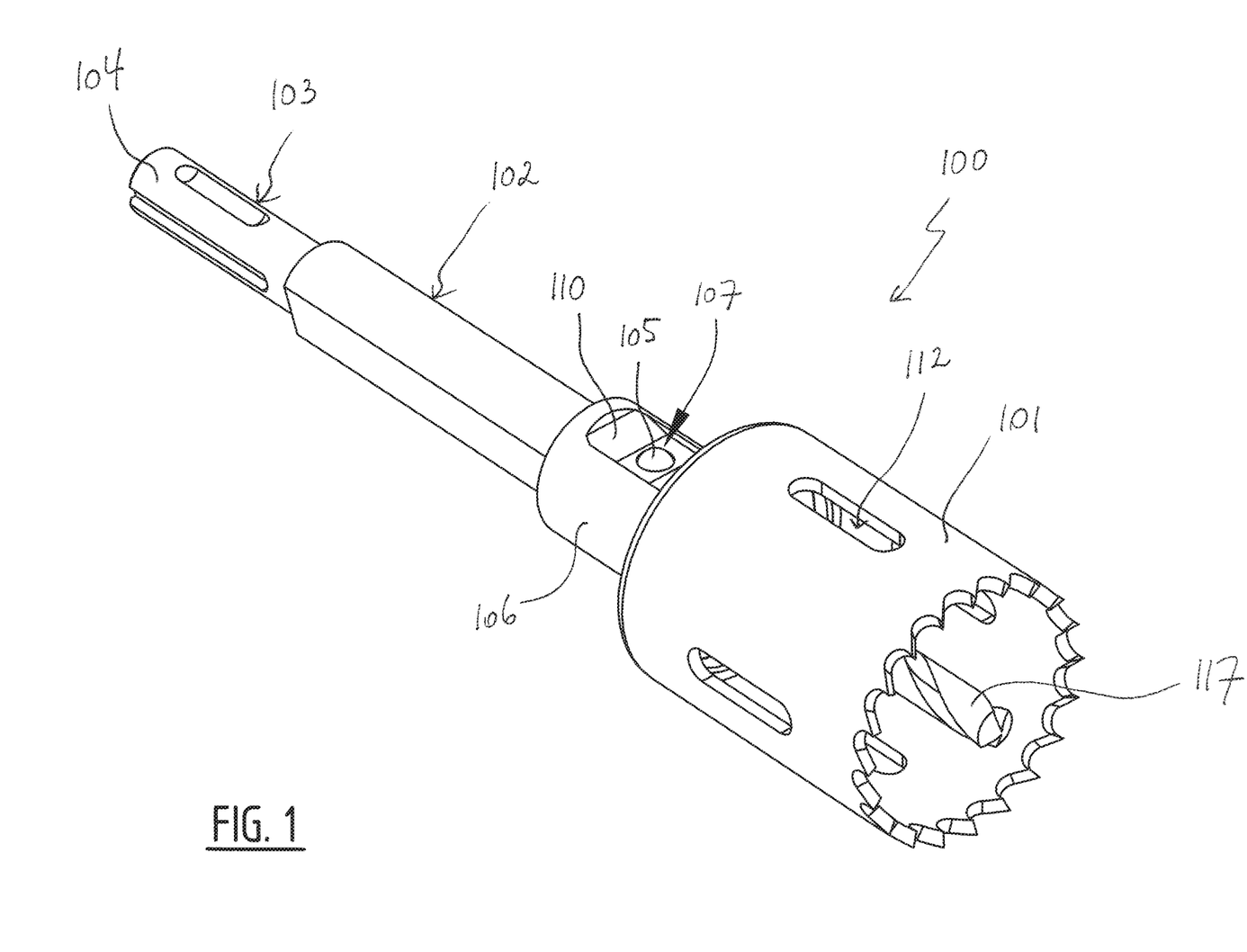
FIG. 1 shows a perspective view of a preferred embodiment of the quick change tool according to the invention in locked state.

FIG. 1 shows a perspective view of a preferred embodiment of quick change tool 100 according to the invention, wherein a tool element in the form of a hole saw 101 is arranged locked onto an elongate body 102 in the form of a shaft. Body 102 comprises at an outer end a drive shaft 103 for arranging a drive device such as a drill thereon. Drive shaft 103 has for this purpose for instance a cylindrical, conical or SDS rapid-action coupling 104 for arranging body 102 on the drill by means of a snapping movement. At an opposite outer end body 102 has attaching means in the form of a locking pin 105 for arranging hole saw 101 thereon in locking manner at said outer end. Hole saw 101 comprises for this purpose at its end facing toward body 102 a receiving element 106 with a locking hole 107 therein for receiving locking pin 105 of elongate body 102 therein.

Figure 2:
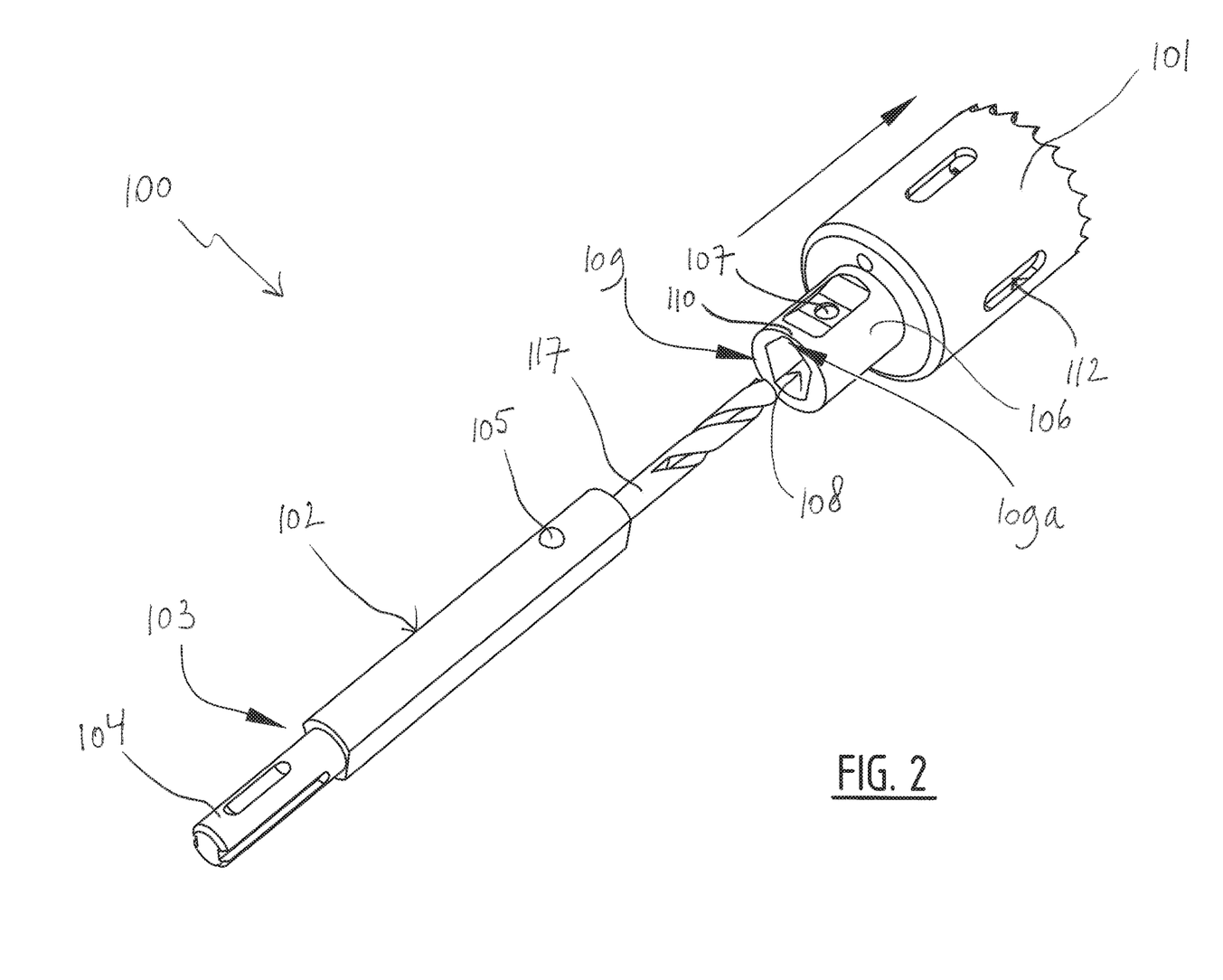
FIG. 2 shows a perspective view of the preferred embodiment of FIG. 1 in unlocked state.

FIG. 2 shows a perspective view of the preferred embodiment of FIG. 1, wherein hole saw 101 is unlocked from body 102. It is clearly visible that receiving element 106 has a through-hole 108 whereby receiving element 106 of hole saw 101 and hole saw 101 itself can be slid over body 102 in order to arrange and lock hole saw 101 on(to) body 102 and to uncouple hole saw 101 from body 102 by means of a sliding movement in a direction along the longitudinal axis of body 102. A periphery of through-hole 108 is formed such that it corresponds to the shape of the periphery of body 102, so that hole saw 101 is rotationally locked relative to body 102 in the situation in which it is arranged on body 102. As shown, the cross-sections of through-hole 108 and body 102 have a shape which is not infinitely rotation-symmetrical, whereby the rotational locking is brought about. Receiving element 106 further comprises a locking hole 107 for receiving therein the locking pin 105 of elongate body 102 in order to also lock hole saw 101, in its arranged state, axially relative to body 102. The peripheral shape of through-hole 108 on the receiving side 109 thereof is such that it can receive locking pin 105 in a pin recess 109a therein. In order to lock hole saw 101 to sufficient extent in axial direction and optionally in rotational direction relative to body 102, locking pin 105 must however protrude from locking hole 107 of receiving element 106 to a sufficient height. Locking hole 107 must for this purpose extend sufficiently deep in receiving element 106. At the same time, in the situation in which it is arranged in locking hole 107 locking pin 105 must be reachable from outside receiving element 106 and must be movable out of locking hole 107 by means of being pressed in slightly. Wall 110 of receiving element 106 is for this purpose formed such that, on the one hand, through-hole 108 can receive locking pin 105 on a receiving side 109 thereof in a pin recess 109a without problem and that, on the other hand, it has sufficient thickness close to locking hole 107 to sufficiently envelop locking pin 105 in order to be able to withstand the forces exerted on hole saw 101, but is thin enough to enable locking pin 105 to be manipulated from the outside so as to move it out of locking hole 107 in order to enable hole saw 101 to be uncoupled from body 102. This has been made visible in FIG. 3, which shows a cross-sectional side view of quick change tool 100.

Figure 3:
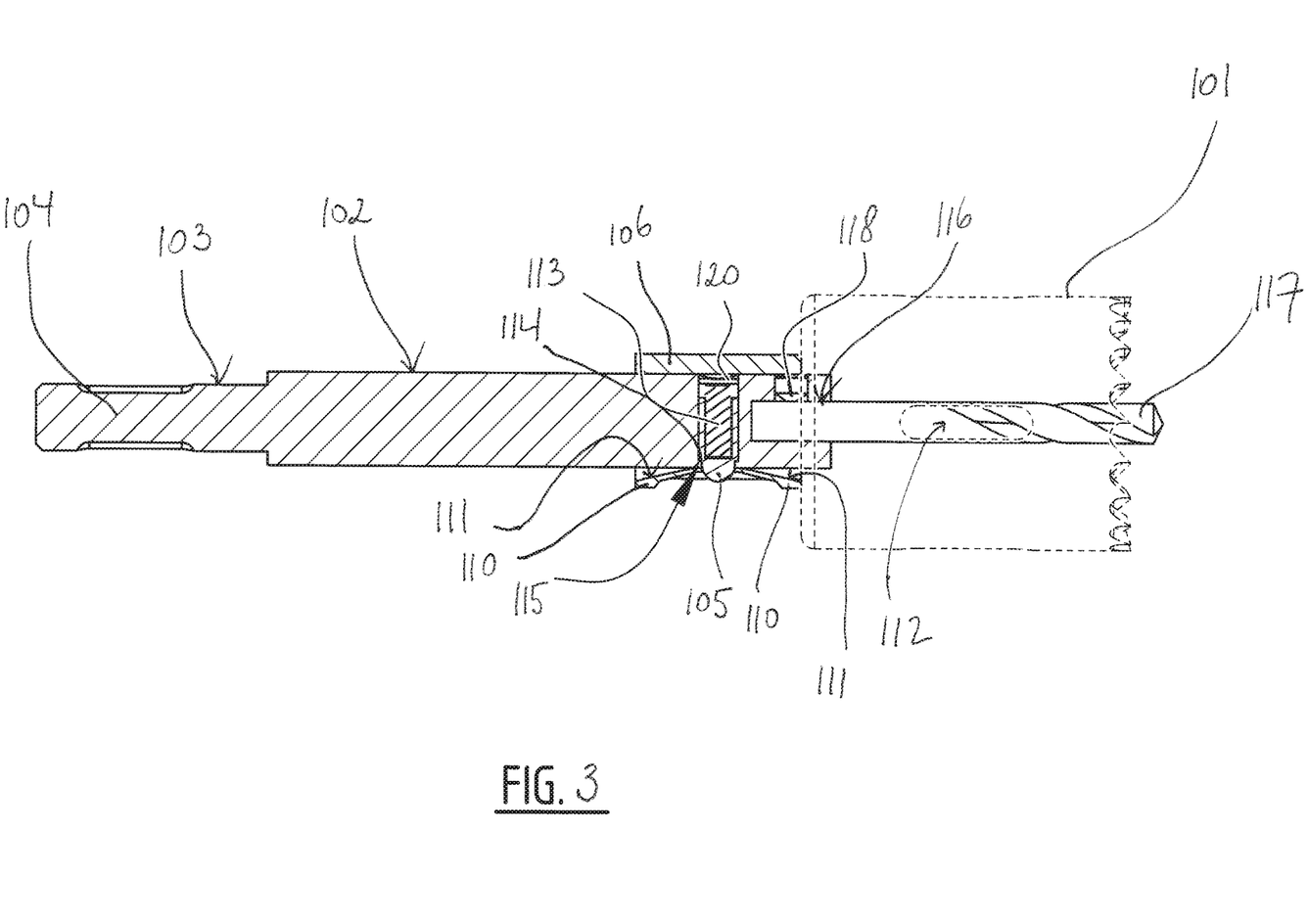
FIG. 3 shows a cross-sectional side view of the preferred embodiment of FIG. 1.

FIG. 3 shows that through-hole 108 in receiving element 106 narrows from a receiving side 109 (see FIG. 4) thereof toward locking hole 107. Although not visible in the figures, the shape of through-hole 108 is such that it can receive locking pin 105 on a receiving side 109 with some rotational clearance and guides locking pin 105 toward locking hole 107 when receiving element 106 is slid over body 102 because through-hole 108 also narrows in tangential direction toward locking hole 107. Such a pin guiding groove 111 has the advantage that locking pin 105 need not be precisely aligned relative to locking hole 107 during receiving of locking pin 105 in pin guiding groove 111. The pin guiding groove or guiding groove 111 allows a small angular deviation between the longitudinal axis of locking pin 105 and an axis extending radially relative to receiving element 106 through the centre of locking hole 107 and/or a translational deviation between locking pin 105 and locking hole 107, which facilitates reception of locking pin 105 in pin guiding groove 111 such that it can be arranged in pin guiding groove 111 without much steering when receiving element 106 is slid over body 102. Wall 110 of receiving element 106 also deepens on its outer side in the above stated direction in order to enable locking pin 105 to be pressed in from the outside so as to move it out of locking hole 107 in order to enable hole saw 101 to be uncoupled from body 102.

Figure 4:
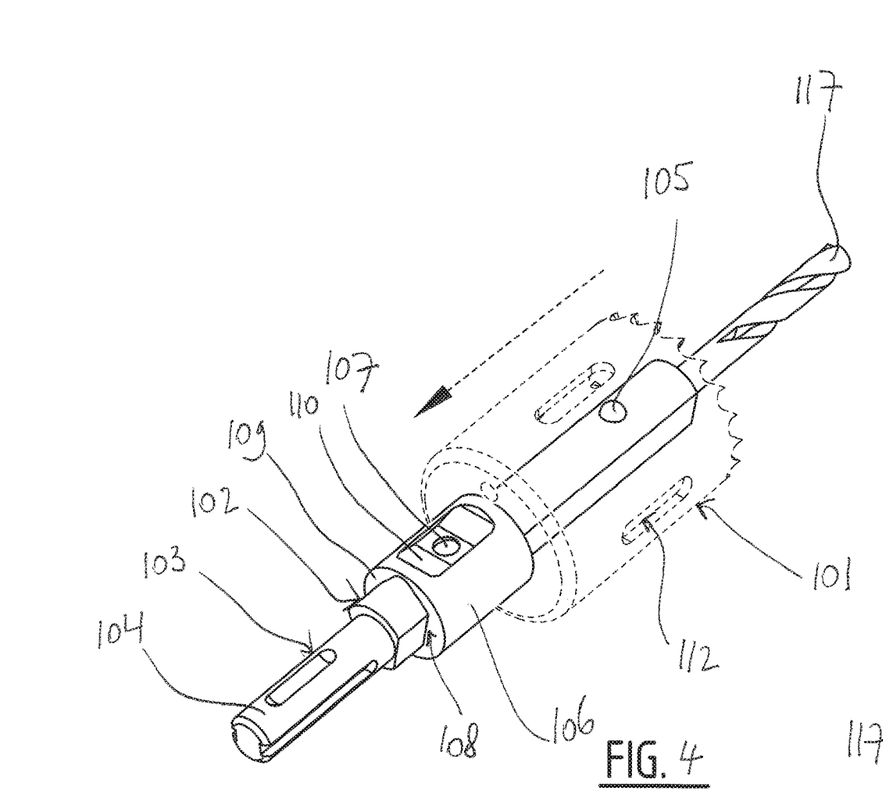
FIG. 4 shows a perspective view of the preferred embodiment of FIG. 1 in unlocked state.

FIG. 3 also shows that through-hole 108 and the outer side of wall 110 narrow in the same way toward locking hole 107 on either side of locking hole 107, i.e. on the side directed toward drive shaft 103 and on the side directed toward hole saw 101. In this way, as shown in FIG. 4, hole saw 101 can be slid toward and from the side of drive shaft 103 or from and toward locking pin 105 in order to be locked. This makes it possible to uncouple hole saw 101 and slide it over body 102 from the outer end of body 102 remote from drive shaft 103 toward drive shaft 103, and then move it back toward said outer end in order to once again lock hole saw 101 by means of receiving element 106. This makes it possible to remove material which has accumulated in a recess 112 of hole saw 101 between two successive sawing operations, such as a ball of wood, plaster, concrete, PVC or other, optionally composite, plastic materials, from hole saw 101 by uncoupling hole saw 101 and moving it away from the sawn material, and then once again snap-locking hole saw 101 onto body 102 by means of receiving element 106 for a subsequent sawing operation. The pin guiding groove 111 on the hole saw side is particularly advantageous here, since hole saw 101 covers the outer end of body 102 remote from drive shaft 103 all the way around, if receiving element 106 is situated close to locking pin 105, and locking pin 105 can therefore not be easily steered from the outside to locking hole 107.

The preferred embodiment of FIG. 3 also shows that locking pin 105 is arranged spring-mounted in body 102 by means of a spring 113, wherein locking pin 105 pushes against a bottom part 120 of body 102 by means of spring 113. In the shown preferred embodiment locking pin 105 has the form of a bottomless hollow cylinder, wherein spring 113 is arranged in the cavity thereof and pushes from the inside against an end surface of locking pin 105 in a radial direction of body 102. In order to prevent locking pin 105, which is under spring pressure, from being able to come loose from body 102 through pin hole 114, a diameter of a portion of locking pin 105 situated in body 102 is greater than the diameter of pin hole 114, whereby an upper side of the portion of locking pin 105 situated in body 102 lies against an inner side of a wall 115 of body 102 close to pin hole 114. An outer wall of body 102 forms as it were a bumper for stopping locking pin 105. FIG. 3 also shows a recess 116 in body 102 on its outer end to be directed toward hole saw 101 for receiving therein for instance a centering drill 117 and a locking in the form of a screw 118 in order to enable said centering drill 117 to be fastened releasably in recess 116.

Figure 5:
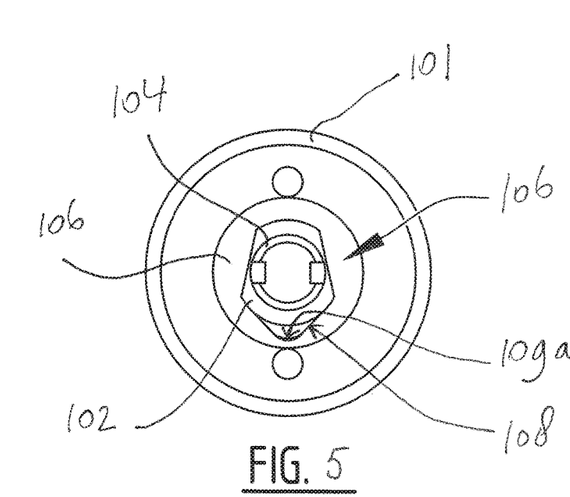
FIGS. 5 and 6 show respectively a rear and front view of the preferred embodiment of FIG. 1.
Figure 6:
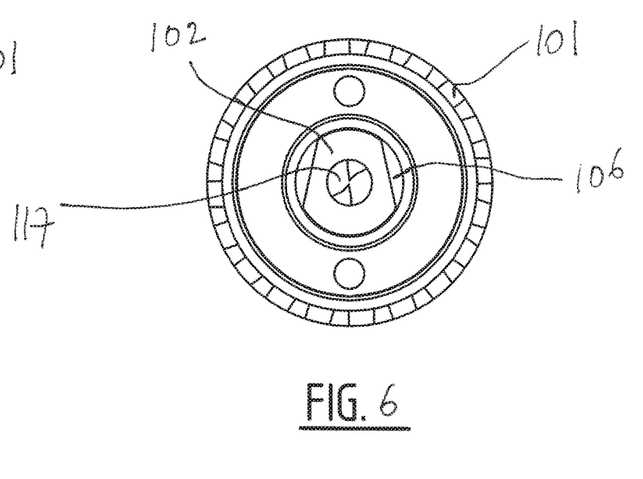
Figure 7:
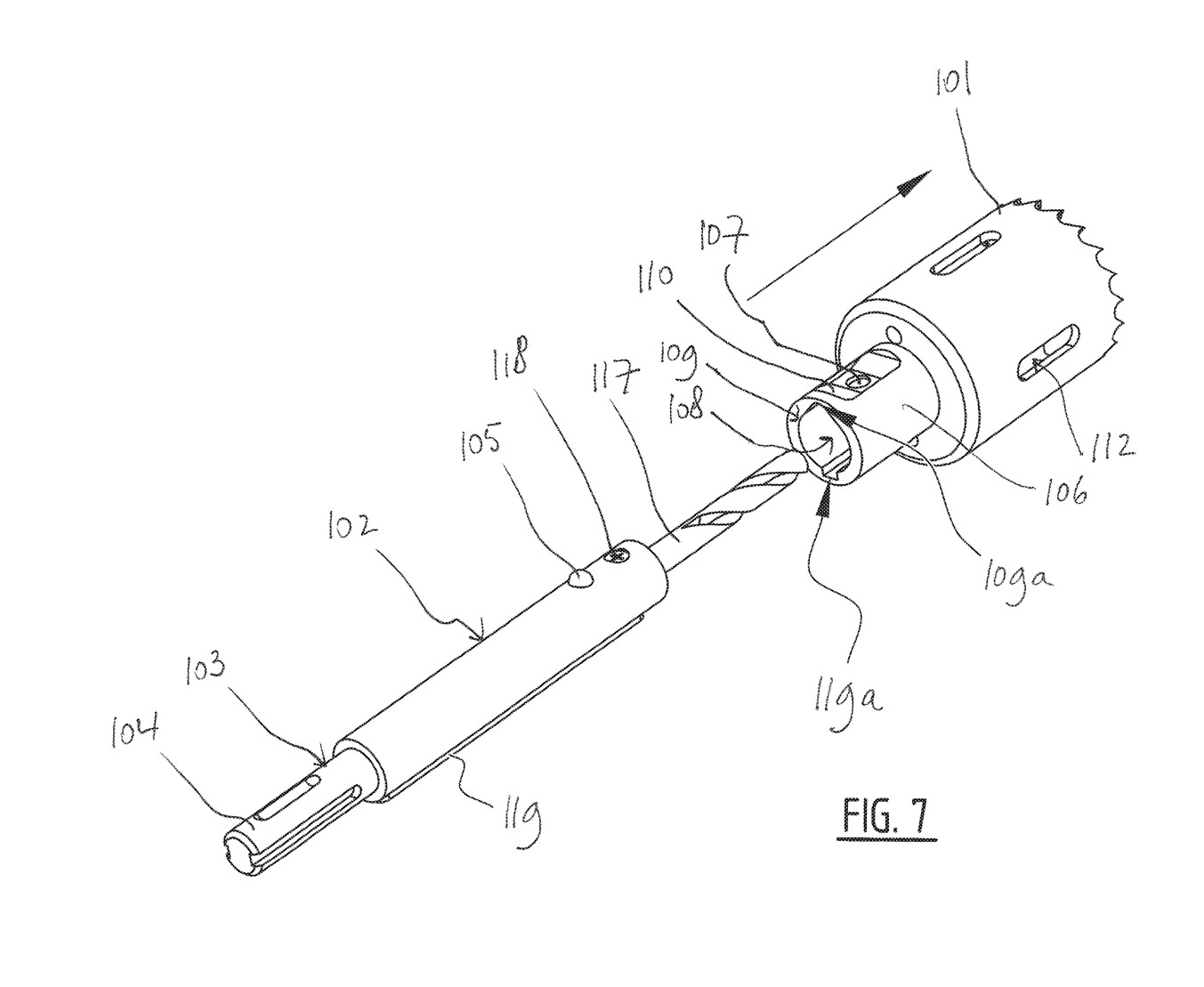
FIG. 7 shows a perspective view of another preferred embodiment of the quick change tool according to the invention in unlocked state.
Figure 8:
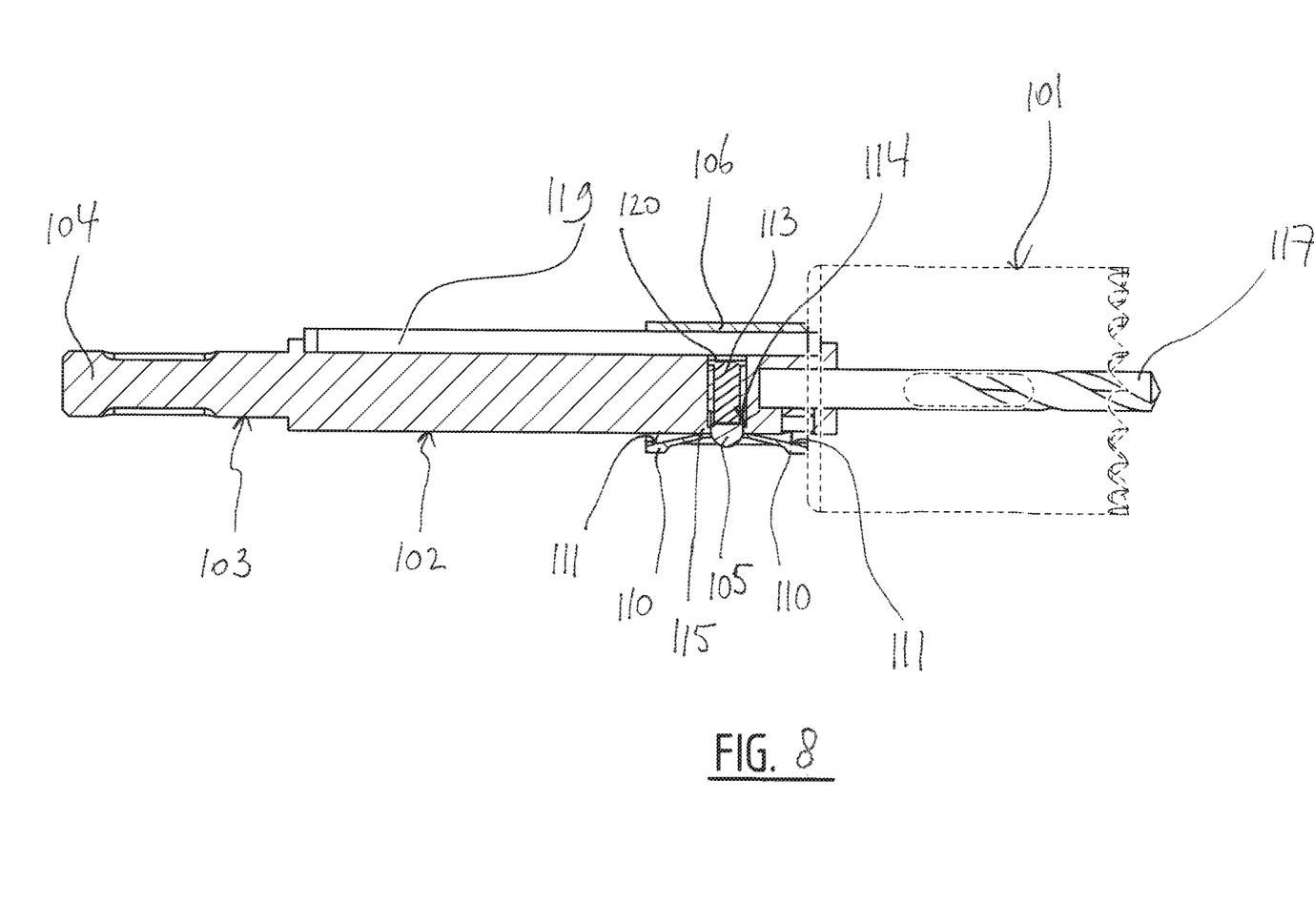
FIG. 8 shows a cross-sectional side view of the preferred embodiment of FIG. 7.
Figure 9:
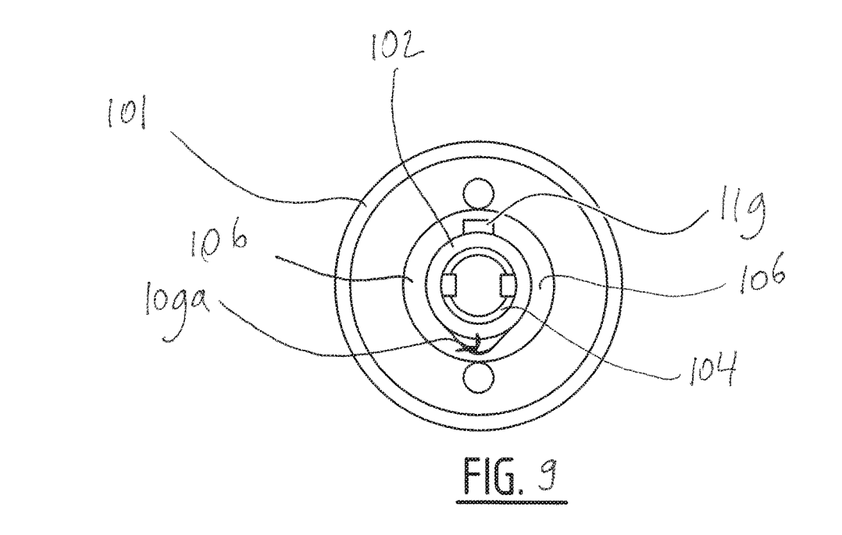
FIGS. 9 and 10 show respectively a rear and front view of the preferred embodiment of FIG. 7.
Figure 10:
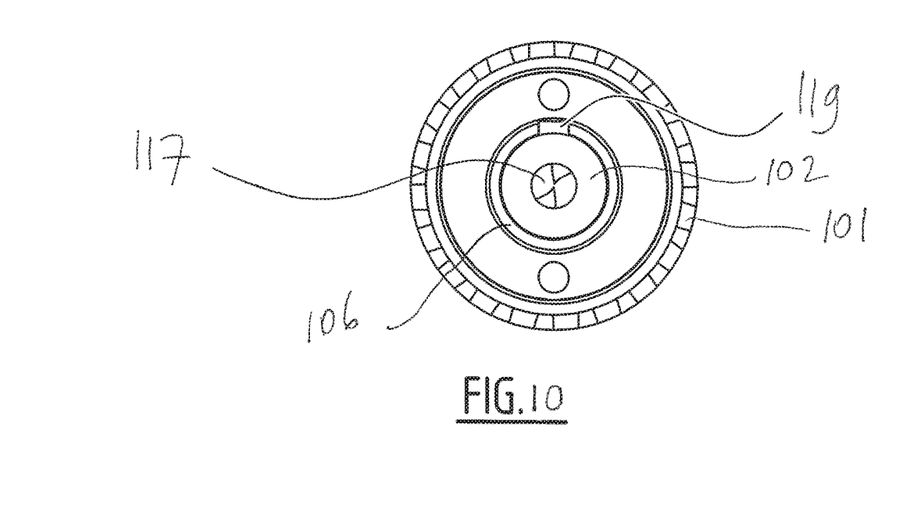

FIGS. 5 and 6 show views in the longitudinal direction of quick change tool 100 as seen respectively from the drive shaft side and the hole saw side. These figures show particularly the cross-sectional shape of body 102 and through-hole 108, which is not infinitely rotation-symmetrical.

FIGS. 7-10 show an alternative preferred embodiment of the quick change tool 100 according to the invention, wherein a key 119 extending in the longitudinal direction of body 102 is arranged in body 102. In order to receive key 119, through-hole 108 of receiving element 106 has a counter-shape with a key recess 119a corresponding to the shape of the substantially cylindrically formed body 102 with key 119 therein, so that receiving element 106 can move freely over body 102 in the axial direction of body 102 but cannot rotate around body 102 round the longitudinal axis of body 102. This ensures an extremely good rotational locking of hole saw 101 relative to body 102. Key 119 also forms a support surface for compression spring 113, which enables a manufacturing method wherein locking pin 105 can be arranged spring-mounted in body 102 in a simple manner.

It is also visible in FIGS. 1-10 that the diameter of body 102 is greater than the diameter of drive shaft 103. A particular advantage of such a proportion between the diameter of body 102 and the diameter of drive shaft 103 is that quick change tool 100 is very stable and is therefore not susceptible, or only susceptible to very limited extent, to clearance between the different components. A large diameter of body 102 also provides space 116 for a mechanism for fixing a centering drill 117 in, which facilitates positioning of hole saw 101 on the wall or floor to be machined.

The present invention is not limited to the shown embodiments but also extends to other embodiments falling within the scope of protection of the appended claims.

The invention claimed is:

1. A quick change tool, comprising:
   a tool element;
   an elongate body comprising:
      close to a first outer end thereof a drive shaft for driving the elongate body by means of a drive device to be arranged thereon; and
      close to a second outer end thereof lying opposite the first outer end attaching means for attaching the tool element to the elongate body; and
   a receiving element for attaching to the tool element, having a through-hole for receiving the elongate body by sliding through the receiving element in the longitudinal direction of the elongate body,
   wherein the receiving element is configured to co-act with the attaching means to lock the tool element relative to the elongate body at least in axial direction of the drive shaft,
   wherein the attaching means comprise a locking pin which is arranged spring-mounted in the body and which is resiliently movable between a rest position, wherein the locking pin protrudes radially outward from the body to a protruding height through a pin hole in the body, and a retracted position wherein the locking pin is situated at least substantially wholly in the body, and
   wherein the receiving element comprises:
      a locking hole which is configured to receive the locking pin therein in a manner in which it snaps from its retracted position to its rest position; and
      a pin guiding groove extending between a receiving opening of the through-hole and the locking hole for guiding the locking pin from the receiving opening to the locking hole and simultaneously moving it from its rest position to its retracted position.

2. The quick change tool as claimed in claim 1, wherein the pin guiding groove extends from a receiving opening of the through-hole remote from the tool element to the locking hole and/or from a receiving opening of the through-hole directed toward the tool element to the locking hole.

3. The quick change tool as claimed in claim 1, wherein the pin guiding groove is arranged in an inner surface of a wall of the receiving element forming the periphery of the through-hole such that the pin guiding groove can receive the locking pin in its rest position at the receiving opening.

4. The quick change tool as claimed in claim 1, wherein a depth of the locking hole is determined by a thickness of the wall at the position of the pin guiding groove close to the locking hole, wherein the thickness is such that the locking pin in its rest position in the locking hole can withstand at least forces exerted on the tool element in the axial direction of the drive shaft in order to lock the tool element relative to the body at least in the axial direction of the drive shaft, and that the locking pin can be pressed through the locking hole into the pin guiding groove from the outside by hand in order to unlock the tool element relative to the body at least in axial direction of the drive shaft.

5. The quick change tool as claimed in claim 1, wherein when the tool element is arranged on the body, an inner side of the wall at the position of the pin guiding groove close to the locking hole lies at least substantially against an outer side of the body at the position of the locking pin.

6. The quick change tool as claimed in claim 1, wherein the wall at the position of the pin guiding groove is locally thickened close to the receiving opening in the form of an upright edge or ridge.

7. The quick change tool as claimed in claim 1, wherein the pin guiding groove has a conical form, and wherein the pin guiding groove narrows in the direction of the locking hole.

8. The quick change tool as claimed in claim 1, wherein a guiding angle between a longitudinal axis of the pin guiding groove and a longitudinal axis of the body is between 1 and 60 degrees.

9. The quick change tool as claimed in claim 1, wherein a length of the receiving element is between 10 and 50 mm.

10. The quick change tool as claimed in claim 1, wherein the locking pin is arranged spring-mounted in the body by means of a compression spring, and wherein a diameter of a portion of the locking pin situated in the body is greater than the diameter of the pin hole.

11. The quick change tool as claimed in claim 1, wherein the shape of a cross-section of the body close to the attaching means is not infinitely rotation-symmetrical, and corresponds at least substantially to the shape of the through-hole.

12. The quick change tool as claimed in claim 11, wherein the body is at least substantially cylindrical, and flattened close to the attaching means, such that a cross-section of the body comprises at least a straight side close to the attaching means.

13. The quick change tool as claimed in claim 11, wherein a key is arranged in the body at least close to the attaching means.

14. The quick change tool as claimed in claim 13, wherein the key forms a support surface for the compression spring.

15. The quick change tool as claimed in claim 1, wherein the diameter of the body is greater than the diameter of the drive shaft.

16. The quick change tool as claimed in claim 15, wherein the diameter of the body is between 5 and 30 mm.

17. The quick change tool as claimed in claim 1, wherein the body is configured for attaching a centering drill releasably thereto close to the second outer end thereof.

18. The quick change tool as claimed in claim 1, wherein the tool element comprises a hole saw.

\* \* \* \* \*